(12) United States Patent
Shakir et al.

(10) Patent No.: US 7,983,313 B2
(45) Date of Patent: Jul. 19, 2011

(54) SYSTEM AND METHOD FOR COUPLING MULTIPLE BEAMS TO AN ACTIVE FIBER

(75) Inventors: Sami A. Shakir, Albuquerque, NM (US); Burke E. Nelson, Albuquerque, NM (US); William R. Culver, Albuquerque, NM (US); Michael M. Fitelson, Columbia, MD (US); Jerry W. Hedrick, Arnold, MD (US); George M. Bates, Burke, VA (US)

(73) Assignee: Northrop Grumman Information Technology, Inc., Los Angeles, CA (US)

( * ) Notice: Subject to any disclaimer, the term of this patent is extended or adjusted under 35 U.S.C. 154(b) by 69 days.

(21) Appl. No.: 12/320,622

(22) Filed: Jan. 30, 2009

(65) Prior Publication Data
US 2010/0195676 A1 Aug. 5, 2010

(51) Int. Cl.
*H01S 3/30* (2006.01)
*H01S 3/10* (2006.01)
*H01S 3/08* (2006.01)
*G02B 6/26* (2006.01)
*G02B 6/32* (2006.01)

(52) U.S. Cl. ........... 372/6; 372/20; 372/23; 372/108; 385/25; 385/26; 385/33; 385/35

(58) Field of Classification Search ............ 372/6, 20, 372/23, 108; 385/25, 26, 33, 35
See application file for complete search history.

(56) References Cited

U.S. PATENT DOCUMENTS

| | | | | |
|---|---|---|---|---|
| 5,008,887 A * | 4/1991 | Kafka et al. | ...... | 372/6 |
| 5,122,657 A * | 6/1992 | De Bie et al. | ...... | 250/227.2 |
| 2002/0181512 A1 * | 12/2002 | Wang et al. | ...... | 372/6 |
| 2009/0028502 A1 * | 1/2009 | Presley et al. | ...... | 385/18 |

* cited by examiner

*Primary Examiner* — Minsun Harvey
*Assistant Examiner* — Patrick Stafford
(74) *Attorney, Agent, or Firm* — Andrews Kurth LLP

(57) ABSTRACT

A system and a method for coupling multiple pump light beams to an active fiber. The system including an inverted conical disk, concave lens or glass wedge, an active fiber placed in a center of the inverted conical disk (or concave lens) or at a bottom facet of the glass wedge and a plurality of pump light sources. The system further includes a plurality of lenses for focusing pump light beams from pump light sources towards a side of the inverted conical disk, concave lens or glass wedge, wherein the inverted conical disk, concave lens or glass wedge, couples the pump light beams into the active fiber.

A method for coupling multiple pump light beams to an active fiber. The method includes providing an inverted conical disk, concave lens or glass wedge. The method further includes providing an active fiber in approximately the center of the inverted conical disk (or concave lens) or at a bottom facet of the glass wedge. The method further includes pump light sources for emitting pump light beams and focusing lenses for focusing pump light beams toward the axis of the active fiber. Pump light beams are emitted towards the side of the inverted conical disk, concave lens, or glass wedge and coupled to the active fiber.

14 Claims, 9 Drawing Sheets

SYSTEM AND METHOD FOR COUPLING MULTIPLE BEAMS TO AN ACTIVE FIBER

BACKGROUND

Recent advances in high power fiber lasers have shown the utility of fiber lasers for high power industrial applications such as metal welding and cutting and also for military applications. Unlike many industrial applications, military applications generally involve propagating a beam over a long distance, which requires good laser beam quality in addition to high power. High beam quality in fiber lasers can be achieved with single-mode (SM) fiber lasers. However, one of the major hurdles to power-scaling SM fiber lasers to the 10-kilowatt level (generally necessary for military applications) has been the difficulty of coupling high power pump light beams into the SM active fiber laser.

The current state of the art uses diode pump light beams for coupling into a doped fiber of a laser. These coupling methods fall into two categories: end-pumping and side-pumping. In end-pumping methods, pump light beam is coupled in free-space through the end facets of a laser fiber. A limitation of this method is that pump light beams have a limited access area to the laser fiber because of the small size of the fiber facets. The fiber facets are normally less than 0.4 mm in diameter. The resulting necessary logistics of diode pump light beam shaping and coupling adds to the complexity of system and reduces system reliability and stability. Ultimately, the coupled power is limited by damage to the anti-reflection coatings of the fiber facets.

In side-pumping methods, pump light beam is coupled through the sides of the fiber. For example, U.S. Pat. No. 5,854,865 issued to Goldberg discloses a fiber amplifier side-pumped by a V-shaped notch cut into the cladding of the doped amplifier fiber. Pump light beam is then reflected off the tilted planes of the notch and directed along the core of the fiber. In U.S. Pat. No. 6,625,345 issued to Hollister, a prism in optical contact with the side of the fiber is used to couple pump light beam into the fiber. In U.S. Pat. No. 5,999,673 issued to Samartsev et al., coupling between a multimode pump fiber pigtail and a double-clad optical fiber is disclosed. The pigtail end of the multimode fiber is tapered and fused to the cladding of the doped optical fiber.

None of the prior art methods combine pump light beams from multiple sources efficiently to achieve multi-kilowatt levels of high quality SM fiber laser output. Accordingly, there is a need for an efficient approach to couple enough high power diode pumps into a SM fiber laser to achieve multi-kilowatt levels of high quality SM fiber laser output.

SUMMARY

An advantage of the embodiments described herein is that they overcome the disadvantages of the prior art. Another advantage of certain embodiments is the improved ability for coupling multiple pump light beams to an active fiber.

These advantages and others are achieved by a system for coupling multiple pump light beams to an active fiber. The system includes an inverted conical disk, concave lens or glass wedge, an active fiber placed in a center of the inverted conical disk (or concave lens) or at a bottom facet of the glass wedge, and a plurality of pump light sources. The system further includes a plurality of lenses for focusing pump light beams from pump light sources towards a side of the inverted conical disk, concave lens or glass wedge, wherein the inverted conical disk, concave lens or glass wedge couples the pump light beams into the active fiber.

These advantages and others are also achieved by a method for coupling multiple pump light beams to an active fiber. The method includes providing an inverted conical disk, concave lens or glass wedge. The method further includes providing an active fiber in approximately the center of the inverted conical disk (or concave lens) or at a bottom facet of the glass wedge. The method further includes providing pump light sources for emitting pump light beams and focusing lenses for focusing pump light beams toward the axis of the active fiber. Pump light beams are emitted towards the side of the inverted conical disk, concave lens, or glass wedge and coupled to the active fiber.

DESCRIPTION OF THE DRAWINGS

The detailed description will refer to the following drawings, wherein like numerals refer to like elements, and wherein.

DETAILED DESCRIPTION

Described herein are embodiments of a system and method for coupling light beams from multiple high power diode pump sources into an active fiber using side pumping. Embodiments of the system and method for coupling multiple beams to an active fiber are useful for high power (kilowatt level) fiber lasers and amplifiers.

Figure 1:
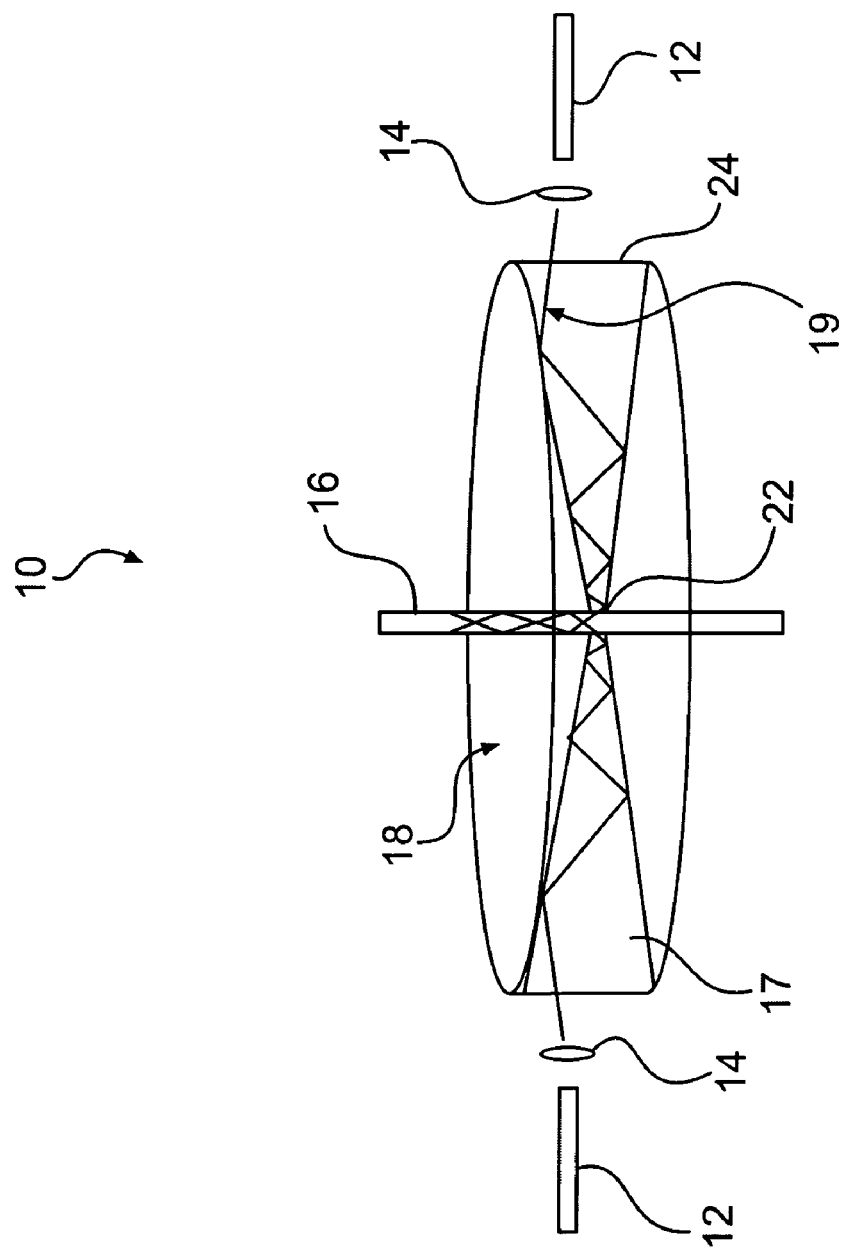
FIG. 1 is a schematic diagram of an embodiment of a system for coupling multiple beams to an active fiber.

Referring now to FIG. 1, shown is an exemplary embodiment of system 10 for coupling multiple beams to an active fiber. As shown, system 10 includes pump light sources 12, focusing lenses 14, active fiber 16 and inverted conical disk 17. Pump light sources 12 may be fiber pigtail pumps. Other known pump light sources may be used. Active fiber 16 may be double-clad with a core, inner cladding, and outer cladding. An example of an active fiber is one where the fiber core is doped with a laser material such a rare-earth element. The doped core gets inverted or pumped when a pump light (such as diode pump light) propagates in it. The active fiber becomes capable to amplify a laser signal or become a laser if both ends of the fiber are reflective. Active fiber 16 is placed through the center of an inverted conical disk 17. Active fiber 16 is preferably fused to the material of inverted conical disk 17. Inverted conical disk 17 is preferably formed from the same material as that of the inner cladding (see FIG. 3) of active fiber 16. Inverted conical disk 17 includes depressions or wedges 20 in each plane of inverted conical disk 17. The outer surfaces 18 of inverted conical disk are coated with High Reflectance (HR) coatings. HR coatings can be either metallic or multi-layer dielectric coatings with alternating high and low refractive indicies, such as ZnS, for example.

Pump light beams 19 from pump light sources 12 are coupled into the side of inverted conical disk 17 through focusing lenses 14. Pump light beams 19 travel toward active fiber 16 in a zigzag pattern, as shown. As a result of this zigzag pattern, pump light beams 19 couple into active fiber 16 at small angles in relation to the fiber axis; these small angles efficiently couple the pump light beams 19 into active fiber 16.

Moreover, in this embodiment, the coupling surface area along active fiber 16 is larger than the coupling surface area provided with known end-pumping or side pumping techniques because the entire side or perimeter of inverted conical disk 17 may be used to receive pump light beams 19. As a result, pump light may be coupled into active fiber 16 around its entire circumference. The increased surface area provided by this embodiment of system 10 improves the power handling ability of system 10 without causing damage to the components of system 10. Additionally, the brightness of pump light beams 19 coupled to active fiber 16 is high because pump light beams 19 couple to active fiber 16 at a small angle with respect to the axis of active fiber 16.

Furthermore, the geometrical arrangement of pump light sources 12 is simplified since pump light beams 19 are coupled in a direction normal to active fiber 16 Since the coupling area of inverted conical disk 17 includes the entire side surface around the circumference of inverted conical disk 17, a large number of pump light sources 12 can be arranged around active fiber 16 to achieve higher levels of power than can be achieved with other methods of coupling beams to active fibers. Indeed, high-power-kilowatt level-power can be achieved. The pump light sources 12 may be high power diodes.

One of the effects of the beam coupling of system 10 is that inverted conical disk 17 is heated and requires cooling. The cooling of inverted conical disk 17 may occur at the outer surfaces 18 of inverted conical disk 17. The outer surfaces 18 of inverted conical disk 17 provide relatively large surface areas for the cooling process of inverted conical disk 17.

With continuing reference to FIG. 1, the geometry of inverted conical disk 17 may be described as a full, 360° side-pumping of active fiber 16. Inverted conical disk 17 allows pump light beams 19 to be pumped into the sides of the disk for coupling to active fiber 16. Focusing lenses 14 focus pump light beams 19 toward the axis of active fiber 16 in order to facilitate coupling of the pump light beams into active fiber 16 and avoid coupling errors. Pump light sources 12 may be arranged at varying distances in relation to each other along the circumference of inverted conical disk 17 as the coupling of the pump light beams 19 depends upon the angle of incidence of each pump light beam 19 to the surfaces of the inverted conical disk 17. In an embodiment, active fiber 16 is inserted in a hole drilled in approximately at the center of inverted conical disk 17 with the outer thickness being larger than the thickness of inverted conical disk 17 at the center. The upper 24 and bottom 22 facets of inverted conical disk 17 are conical in shape. In an embodiment, inverted conical disk 17 can be made of two halves with a slit at the center to hold active fiber 16. Active fiber 16 is either fused to inverted conical disk glass material or a liquid of Sodium Silicate may be used to bond active fiber 16 to the glass material of inverted conical disk 17. The outer cladding is removed in the region where active fiber 16 is bonded to the material of inverted conical disk 17. Inverted conical disk 17 may be formed of glass or low loss plastic materials.

Figure 2:
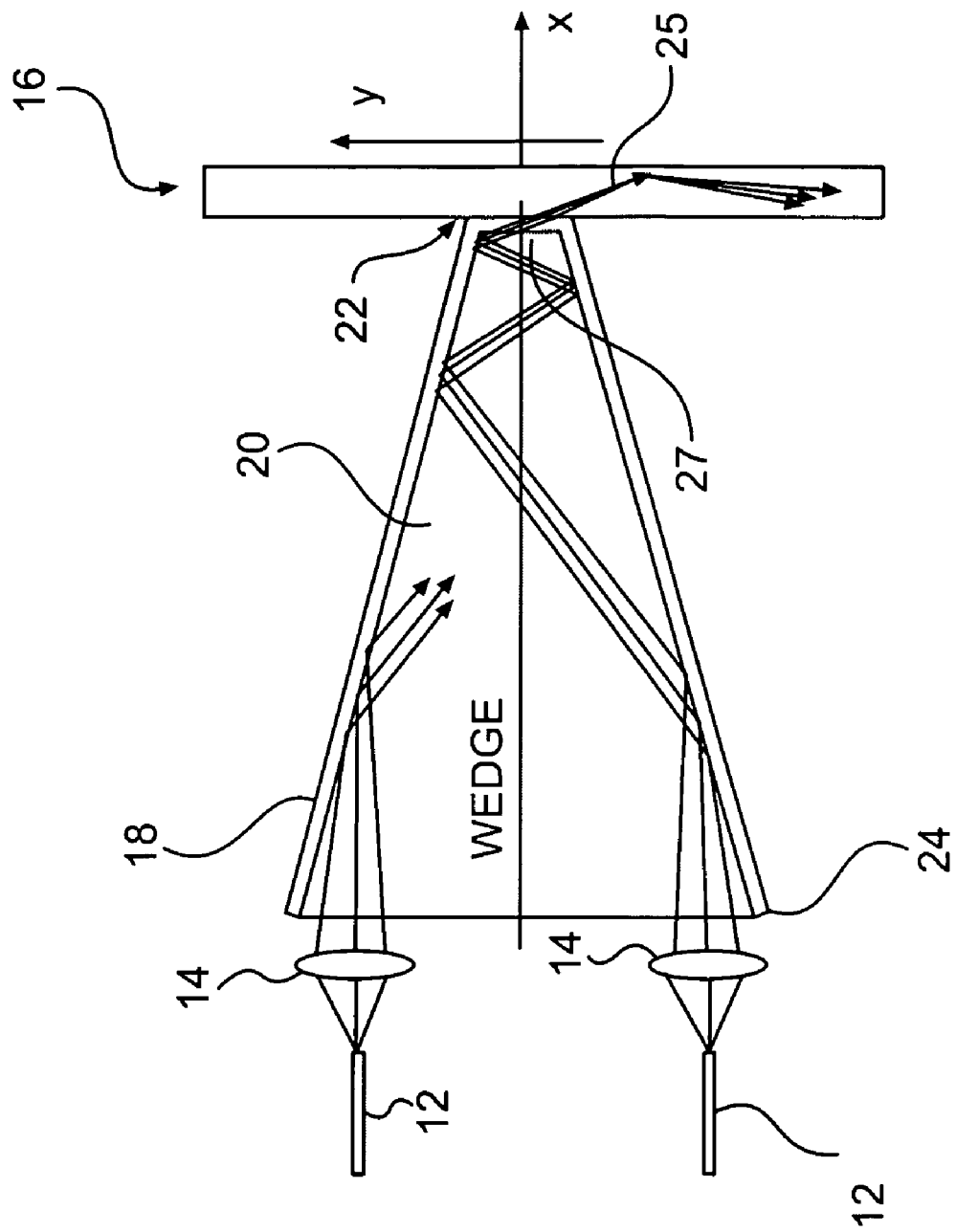
FIG. 2 is a cross-sectional diagram of an embodiment of a system for coupling multiple beams to an active fiber.

Referring now to FIG. 2, shown is a cross-sectional diagram of an exemplary embodiment of system 10 for coupling multiple fiber lasers or fiber amplifiers to an active fiber. In the embodiment shown, system 10 includes pump light sources 12, focusing lenses 14 and glass wedge 20 fused to active fiber 16. FIG. 2 also may serve to illustrate a cross-section of half of inverted conical disk 17 of FIG. 1. In this embodiment, active fiber 16 is a double-clad active fiber and glass wedge 20 includes bottom facets 22 and upper facets 24. Pump light beams 19 are emitted from pump light sources 12 through focusing lenses 14. Pump light beams 19 are incident on two internal reflecting surfaces of glass wedge 20. Outer surface 18 may be coated with a highly-reflective coating to create such reflections. Glass wedge 20 forms multiple reflections of pump light beams 19 by rotating the pump light beams 19 towards the normal to the next reflecting surface by an amount equal to wedge angle ($2\alpha$) 27. Pump light beams 19 would change direction and propagate backwards towards the source if the angle of incidence on the internal reflecting surface of glass wedge 20 becomes equal to or less than zero. However, pump light beams 19 will couple at an angle with respect to the normal of active fiber 16 (i.e., y-axis in FIG. 2) that is approximately equal to wedge angle ($2\alpha$) 27 if pump light beams 19 are positioned to meet the apex of glass wedge 20 before reaching an angle that is equal to or less than zero. If active fiber 16 is placed at the narrow end (bottom facet 22) of glass wedge 20, then the out-coupled beam 25 will couple into active fiber 16.

With continuing reference to FIG. 2, inverted conical disk 17 allows pump light beams 19 to be pumped into the sides of the disk for coupling to active fiber 16 via glass wedge 20. The glass wedge 20 is shaped as an inverted wedge with the outer thickness being larger than the thickness of inverted conical disk 17 at the center. In an embodiment, active fiber 16 is approximately attached to bottom facet 22 of glass wedge 20. Active fiber 16 may be fused to glass wedge 20 directly, or a liquid of Sodium Silicate may be used to bond active fiber 16 to the glass wedge 20. The outer cladding of active fiber 16 is removed in the region where active fiber 16 is bonded to glass wedge 20.

Figure 3:
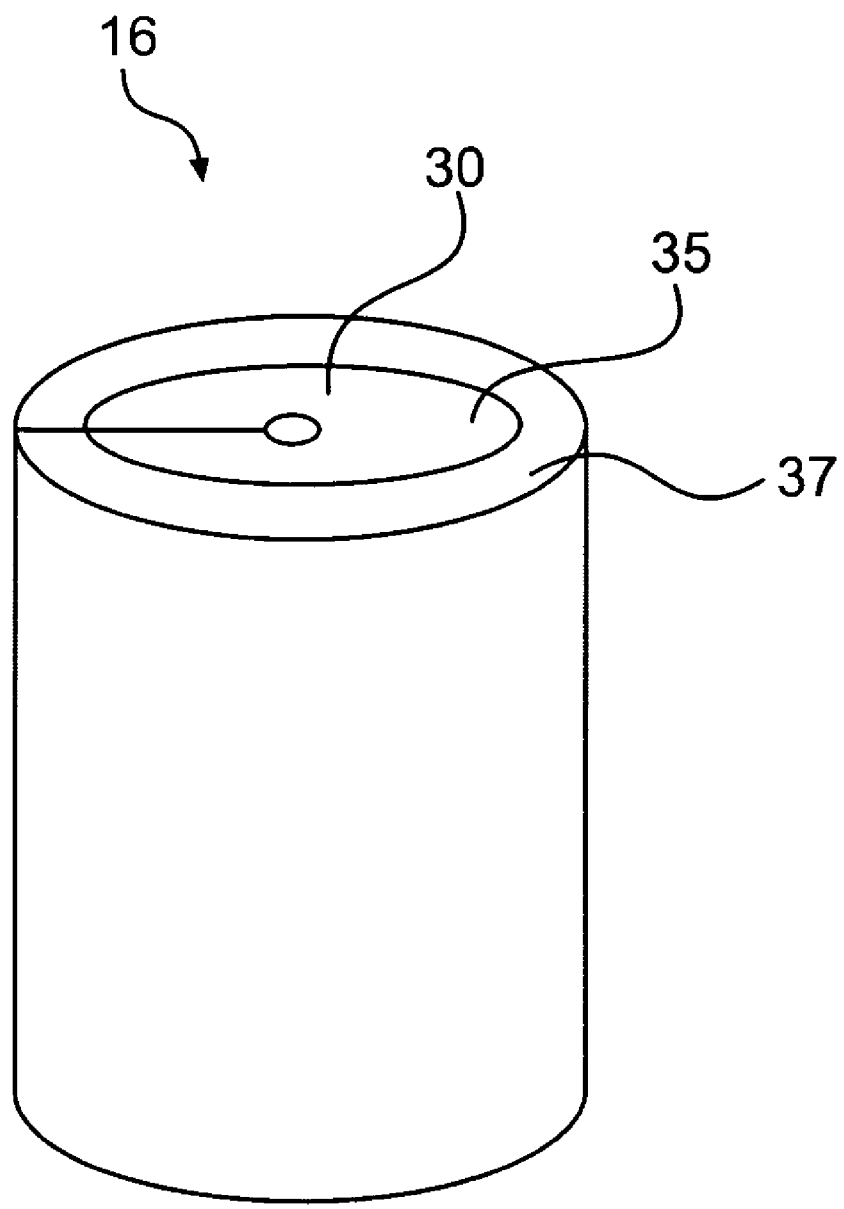
FIG. 3 is a schematic diagram of a double-clad active fiber of an embodiment of a system for coupling multiple beams to an active fiber.

Referring now to FIG. 3, shown is a cross-section of active fiber 16 with double-cladding. Active fiber 16 includes a small core 30 (5-20 μm in diameter) and two concentrically-clad cylindrical layers, inner cladding 35 and outer cladding 37 surrounding core 30. The diameter of the inner cladding 35 may range between 80-400 μm, while the outer cladding 37 is typically thinner than the first cladding by about 100 μm, depending on the material of the second cladding. The core 30 serves as the guide for the laser signals of pump light beams 19. The pump light beams 19 remain within the inner cladding 35 when coupling with active fiber 16 since pump light beams 19 form small angles with the axis of active fiber 16 (due to glass wedge 20 or inverted conical disk 17). The small angles formed by the pump light beams 19 are well within the numerical aperture of active fiber 16. The outer cladding 37 is removed at the region of contact with the apex of glass wedge 20 or inverted conical disk 17. The exposed inner cladding 35 may be fused directly to glass wedge 20 or inverted conical disk 17. Alternatively, material such as a high purity liquid glass (Sodium Silicate) may be used to bond exposed glass (i.e., inter cladding 35) of active fiber 16 to the glass of the wedge 20 or inverted conical disk 17. Sodium Silicate has been shown to be an effective material for bonding glass to glass materials. The optical properties and damage thresholds for Sodium Silicate have been shown to be similar to regular glass.

Figure 4:
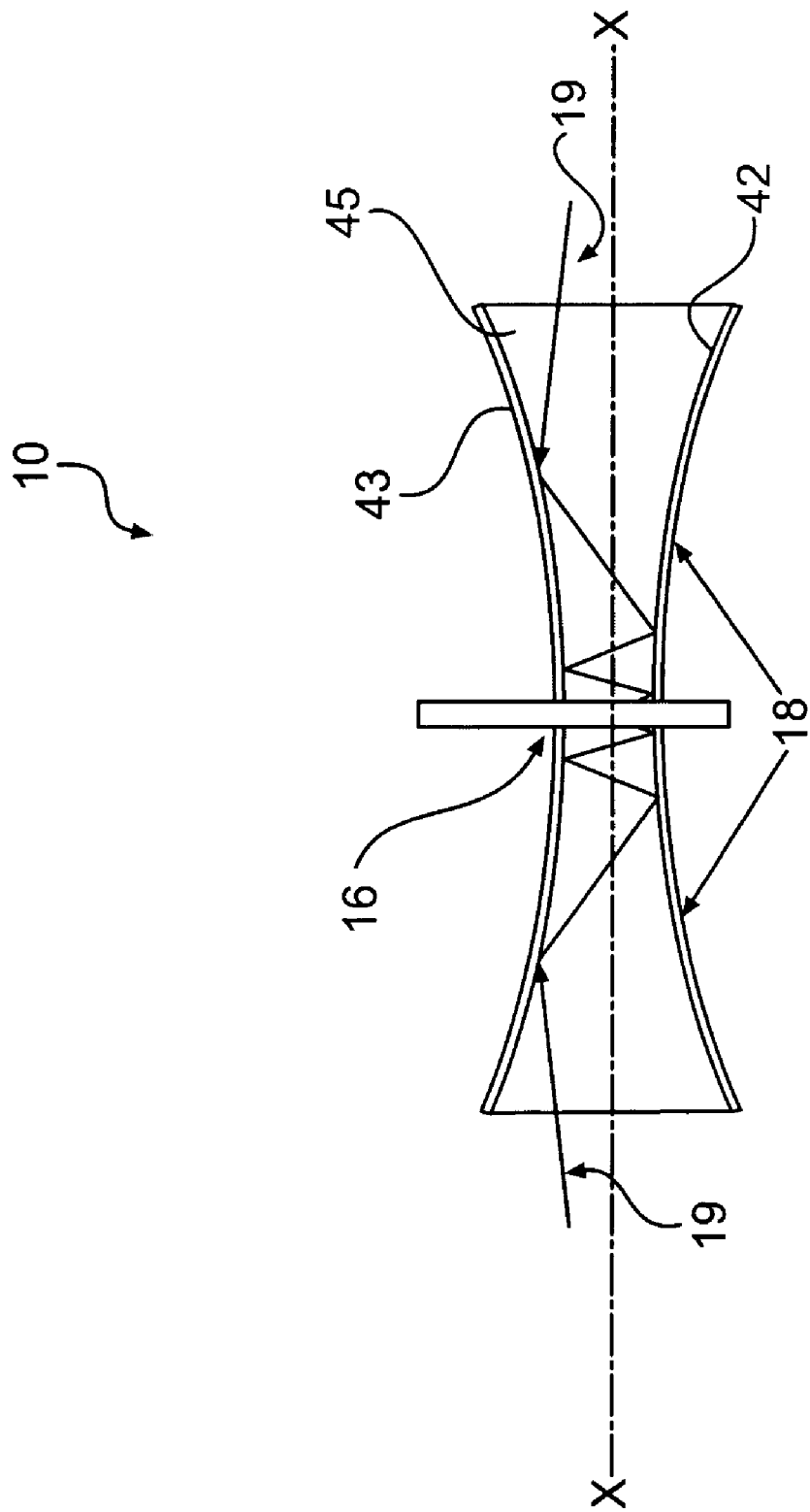
FIG. 4 is a schematic diagram of an embodiment of a system for coupling multiple beams to an active fiber.

With reference to FIG. 4, shown is another embodiment of system 10 for coupling multiple beams to an active fiber. In the embodiment shown, inverted conical disk 17 is substituted for by diverging, concave lens 45. System 10 includes pump light sources (not shown), concave lens 45 and active fiber 16. In an embodiment, concave lens 45 has a hole drilled in its center to accommodate active fiber 16. In this embodiment, the outer surfaces 44 of the concave lens 45 are coated with a high reflection coating.

In order to capture or couple most of pump light beams 19 into active fiber 16, pump light beams 19 are focused so that the focal plane of the concave lens 45 is at the axis of active fiber 16. Preferably, the focal plane matches the focal lengths of concave lens 45 so that all the pump light beams 19 are captured and coupled into active fiber 16.

With continuing reference to FIG. 4, system 40 may be quantitatively analyzed in the instance where pump light beam 19 is launched into the wide base of concave lens 45 at an angle $\psi$ with respect to the horizontal x-axis. The angle of incidence on the first reflecting plane 42 of the concave lens 45 is given by equation 1:

$$\phi_1 = 90 - \psi - \alpha \quad (1)$$

where $\phi_1$ is the angle with respect to the normal to the reflecting plane, and $\alpha$ is the half angle of the concave lens 45 or the tilt angle of each reflecting plane with the x-axis.

The subsequent reflections will obey the iterative formula, equation 2:

$$\phi_{j+1} = \phi_j - 2\alpha \quad (2)$$

where the subscript j represents the j-th reflection and $\phi_j$ is the angle of incidence with respect to the normal to the reflecting plane for the j-th reflection. For j=1, the angle is given by equation 1. Using equation 2, the maximum number of reflections before pump light beam 19 reverses direction and propagates backward may be deduced. This number satisfies the inequality given by equation 3:

$$N \leq \frac{1}{2} + \frac{90 - \psi}{2\alpha}$$

Figure 5A:
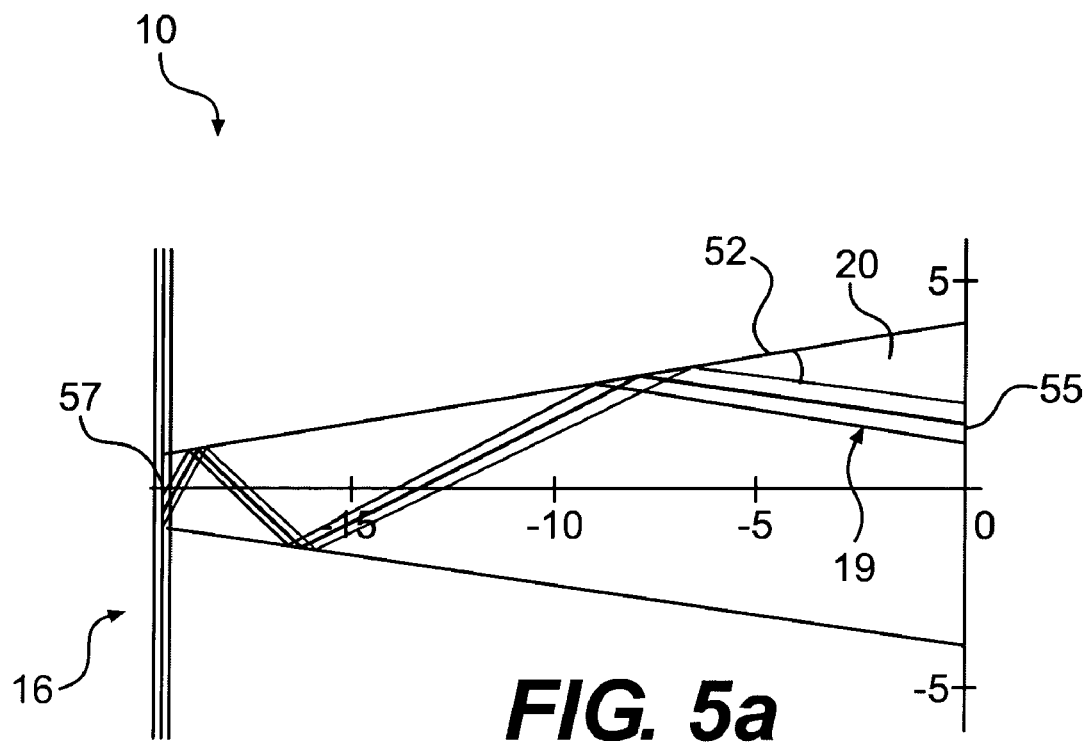
FIG. 5A is a diagram illustrating ray-tracing of pump light beam in an embodiment of a system for coupling multiple beams to an active fiber.
Figure 5B:
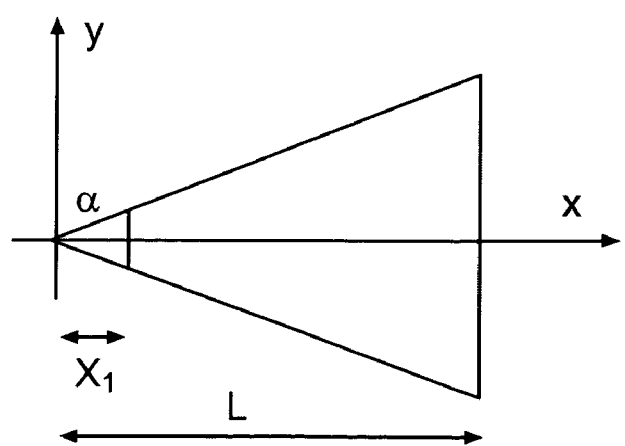
FIG. 5B is a graph illustrating pump light beam angle in relation to the length of inverted conical disk of an embodiment of a system for coupling multiple beams to an active fiber.

Referring now to FIG. 5A, shown is an exemplary diagram tracing the rays of pump light beams 19 in inverted conical disk 17 of system 10. In this example, the inverted conical disk 17 angle is 18° and pump light beam 19 has a convergence angle of 1°. FIG. 5B illustrates a graph of an angle of a pump light beam 19 in relation to the length of inverted conical disk 17 of an embodiment of a system for coupling multiple beams to an active fiber. The length of inverted conical disk 17 along the x-axis is 25 mm. Active fiber 16 has an inner cladding diameter of 400 μm. Ray-tracing allows for the deduction of the position of pump light beam 19 at each reflection. The position at the j-th reflection is given by equations 4 and 5:

$$x_{j+1} = x_j \frac{\tan(\psi + 2j\alpha) - \tan(\alpha)}{\tan(\psi + 2j\alpha) + \tan(\alpha)} \quad (4)$$

$$y_{j+1} = (-1)^j x_{j+1} \tan(\alpha) \quad (5)$$

Starting with the coordinates at the input plane (x0,y0), the coordinates at the first reflection are given by equations 6 and 7:

$$x_1 = \frac{L\tan(\psi) + y_o}{\tan(\psi) + \tan(\alpha)} \quad (6)$$

$$y_1 = x_1 \tan(\alpha) \quad (7)$$

where L is the length of the inverted conical disk 17 along the x-axis. If N reflections take place before coupling into active fiber 16, then pump light beam 19 is coupled at an angle $\theta$ given by equation 8:

$$\theta = 90 - \psi - 2N\alpha \quad (8)$$

where the angle $\theta$ is with respect to the axis of active fiber 16. Also, the x-position at which pump light beam 19 makes the last reflection (N) before changing direction and head backward towards the source, is given by equation 9:

$$x_N = x_1 \prod_{j=1}^{N-1} \frac{\tan(\psi + 2j\alpha) - \tan(\alpha)}{\tan(\psi + 2j\alpha) + \tan(\alpha)} \quad (9)$$

where, $x_1$ is given by equation 6, and the symbol on the right of equation 9 represents the product of the terms dependent on the index j. Active fiber 16 does not have to be positioned immediately after the N-th reflection, in which case the angle of coupling ($\theta$) into active fiber 16 can become larger, as indicated by equation 8.

A typical ray-tracing example employing equations 4-7 is shown in FIG. 5A. In this example, a converging pump light beam 19 focused close to the axis is shown coupling into active fiber 16. For proper coupling, one or more of the following parameters may be adjusted: the angle of incidence ($\psi$) 52, the y-position ($y_o$) of pump light beam 19 entrance 55, and pump light beam 19 convergence angle 57. The convergence angle is dictated by the focal length and position of focusing lens 14. Alternatively, the beam parameters can be specified and used to deduce the required design parameters of inverted conical disk 17.

Figure 6:
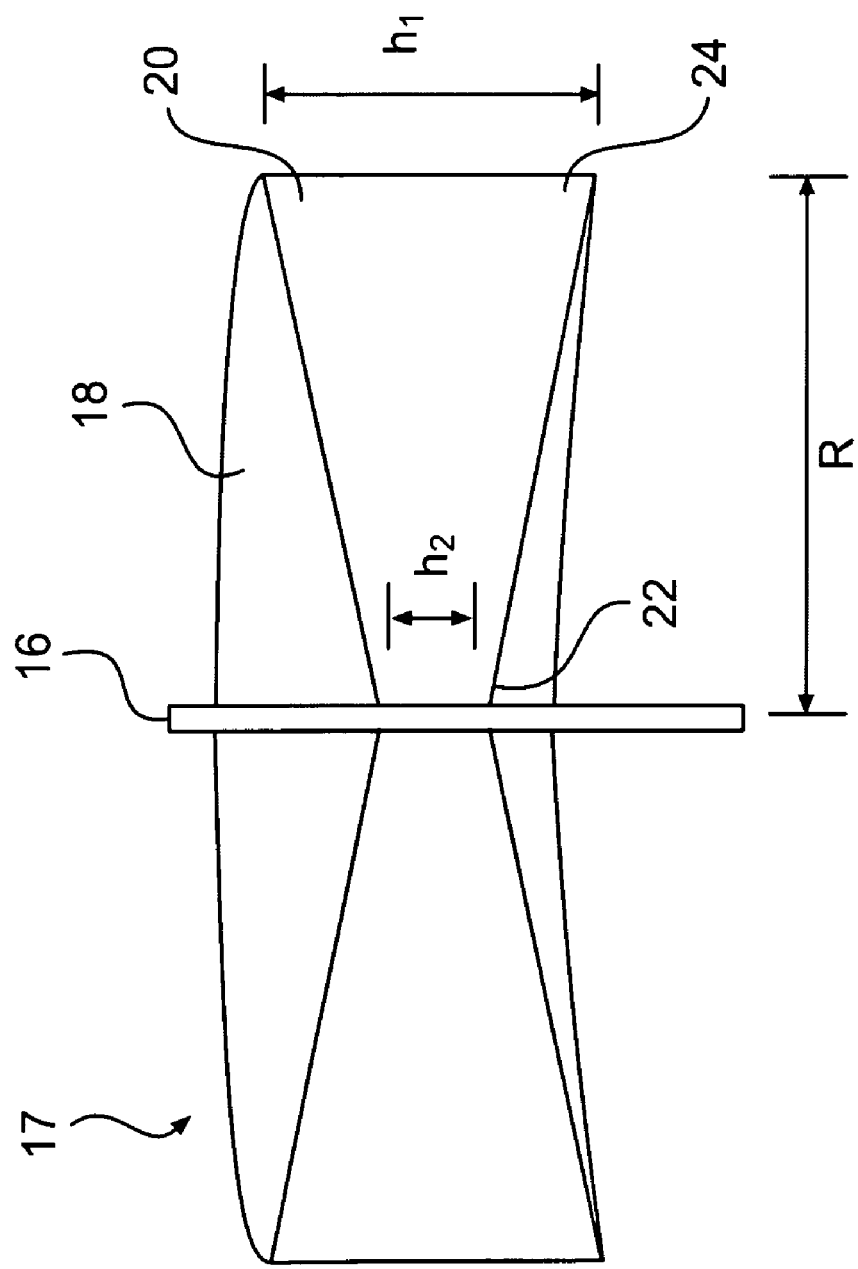
FIG. 6 is a cross-sectional diagram of an inverted conical disk STET an embodiment of a system for coupling multiple beams to an active fiber.

Referring now to FIG. 6, shown is a cross-sectional diagram illustrating the relationship between inverted conical disk 17 parameters represented by equations 10 and 11:

$$h_1 = 2L \tan(\alpha) \quad (10)$$

and $$h_2 = 2x_N \tan(\alpha) \quad (11)$$

Where $h_1$ is the height of the bottom facet 22 and $h_2$ is the upper facet 24 of inverted conical disk 17. Inverted conical disk 17 radius is given by:

$$R_{disk} = L - x_N + R_{fiber} \quad (12)$$

where, $R_{fiber}$ is the radius of active fiber 16. The half-angle of the inverted conical disk 17 is related to the above parameters according to equation 13:

$$\alpha = \tan^{-1}\left\{\frac{h_1 - h_2}{2(R_{disk} - R_{fiber})}\right\} \quad (13)$$

Figure 7:
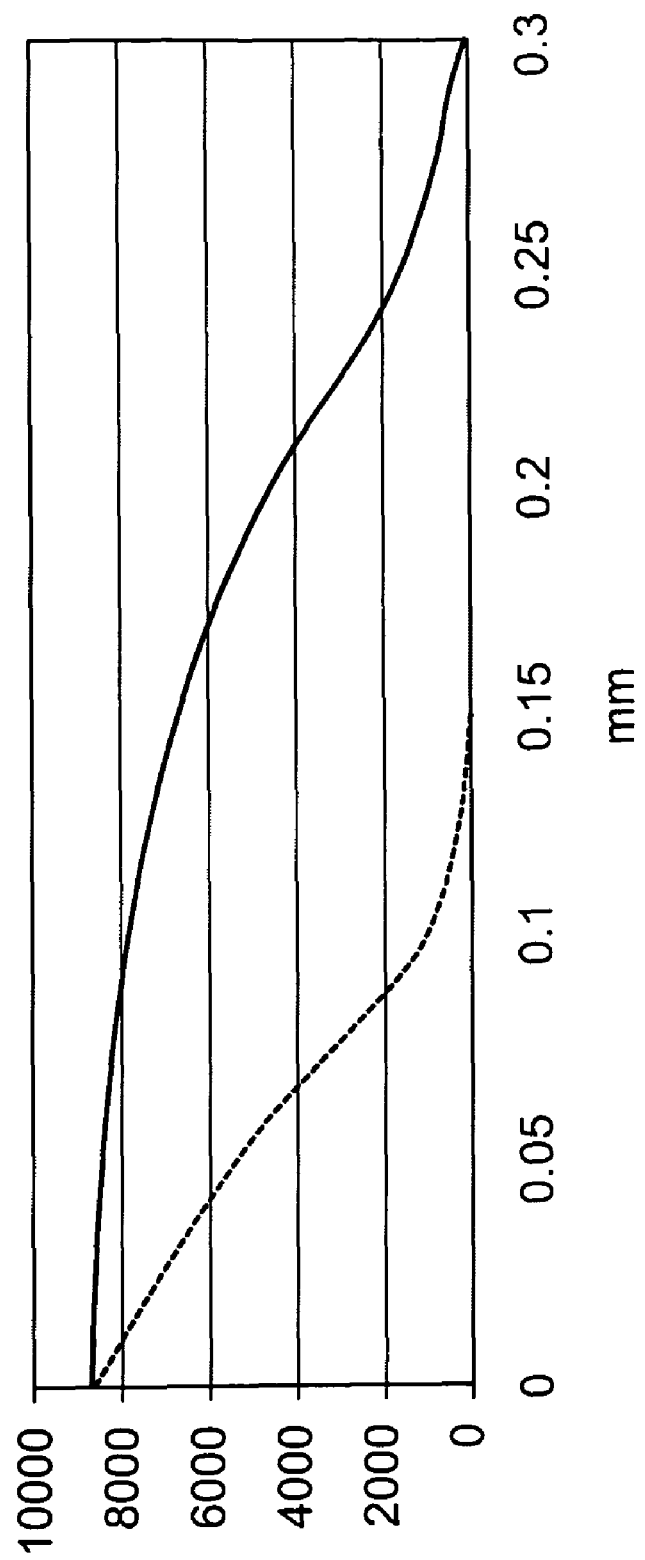
FIG. 7 shows a graph representing alignment sensitivity to translation of source.
Figure 8:
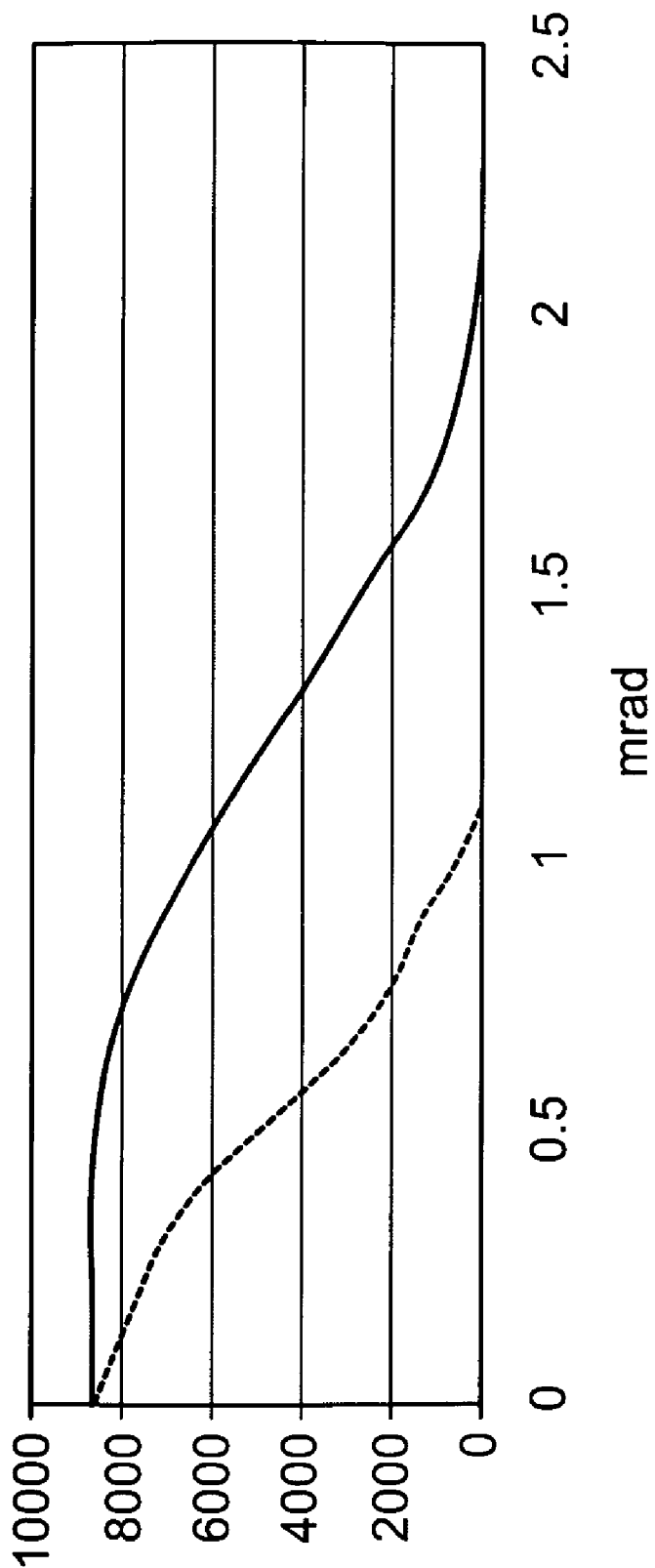
FIG. 8 shows a graph representing alignment sensitivity to angular deviation of source.

Referring now to FIG. 7, shown is a graph representing the alignment sensitivity to translation of source derived from the non-sequential optical model. The dotted line represents the number of pump light beams that are orthogonal to active fiber 16 (not shown). The black line represents the number of pump light beams along the fiber. The y-axis of the graph shows the number of pump light beams and the x-axis of the graph shows the position of the pump light sources as distance from active fiber 16. FIG. 8 shows a graph representing the alignment sensitivity to angular deviation of source derived from the non-sequential optical model. These figures show that the coupling system and method of system 10 tolerates relatively large alignment changes of the source in a plane that contain active fiber 16, but requires more constraint in angle and translation changes that are orthogonal to active fiber 16.

Figure 9:
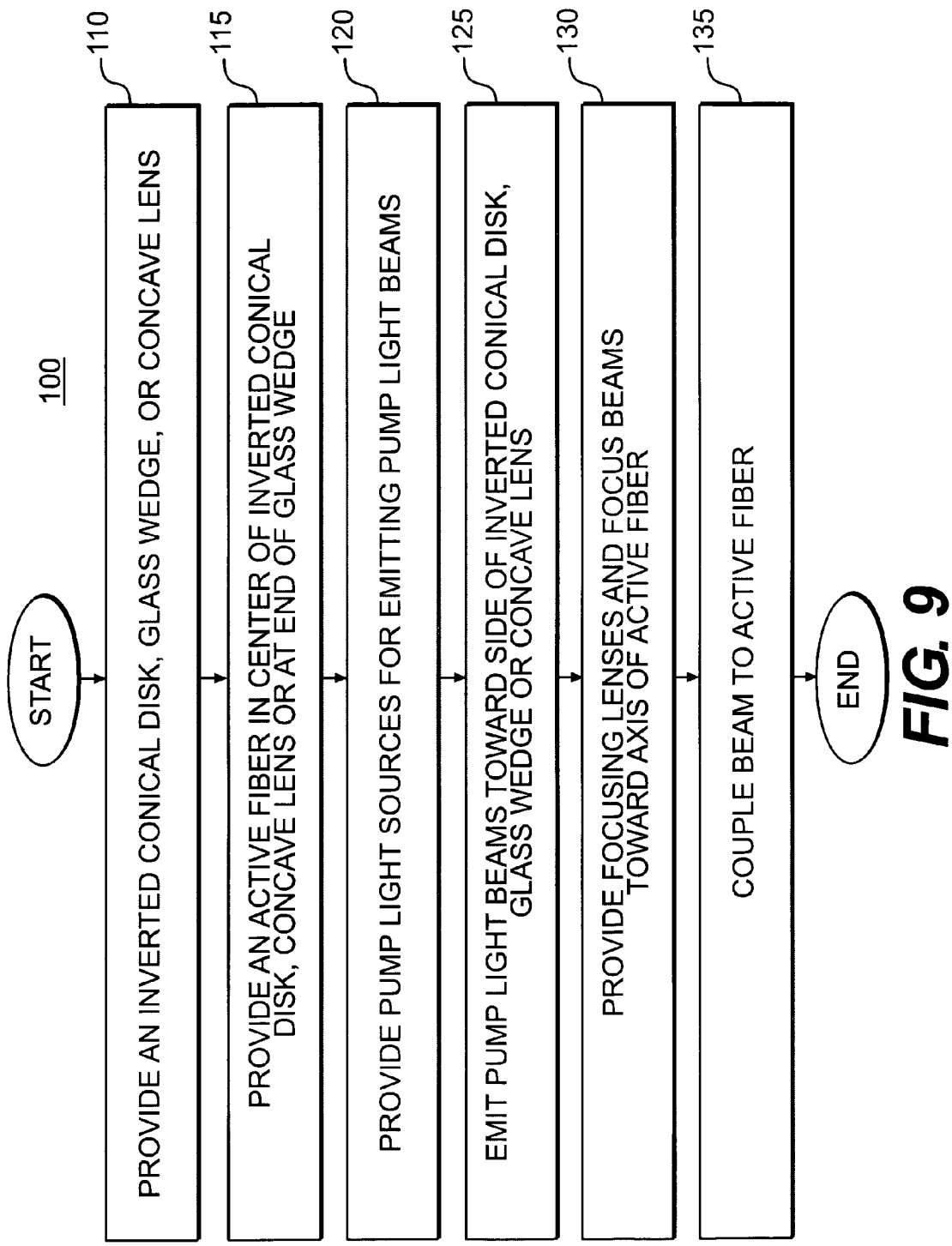
FIG. 9 shows a flow-chart of an embodiment of a method for coupling multiple beams to an active fiber.

Referring now to FIG. 9, shown is a flow-chart of the method (100) for coupling a plurality of pump light beams 19 to active fiber 16. The method includes providing inverted conical disk 17 (110) and active fiber 16 in a center of inverted conical disk 17 or at a bottom facet of the glass wedge 20 (115). In another embodiment, inverted conical disk 17 can be substituted for by a concave lens 45. The method further includes providing pump light sources 12 for emitting pump light beams 19 (120). The method includes emitting and directing pump light beams 19 towards the side of inverted conical disk 17, concave lens 45 or glass wedge 20 (125). The method further includes providing focusing lenses 14 and focusing pump light beams 19 (130) toward the axis of active fiber 16 and coupling pump light beams 19 to the active fiber 16 (135). The pump light beams 19 are focused towards the axis of active fiber 16 to prevent loss of light. If the pump light beams 19 are not focused towards the axis, then some of the light will not couple into the active fiber 16 and is lost outside active fiber 16.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for coupling a plurality of pump light beams to an active fiber, the system comprising:
    an inverted conical disk;
    an active fiber placed in a center of the inverted conical disk, wherein at least a portion of the active fiber extends into the center of the inverted conical disk;
    a plurality of pump light sources; and
    a plurality of lenses for focusing pump light beams from pump light sources toward a side of inverted conical disk, wherein the inverted conical disk, couples the pump light beams into one or more sides of the active fiber.

2. The system of claim 1, wherein the active fiber is fused to the center of the inverted conical disk.

3. The system of claim 1, wherein pump light sources are high power diodes.

4. The system of claim 1, wherein the active fiber is double-clad with an inner and outer cladding.

5. The system of claim 1, wherein the inverted conical disk comprises glass.

6. The system of claim 1, wherein the angle of convergence of the pump light beams to the active fiber is approximately 1°.

7. The system of claim 4, wherein the outer cladding is removed from the active fiber.

8. The system of claim 1, wherein the active fiber generates high power output.

9. A method for coupling a plurality of pump light beam sources, the method comprising:
    providing an inverted conical disk that defines an opening in the center of the inverted conical disk;
    providing an active fiber in the center of the inverted conical disk, wherein at least a portion of the active fiber extends into the opening in the center of the inverted conical disk;
    providing pump light sources for emitting pump light beams;
    providing focusing lenses for focusing pump light beams;
    emitting pump light beams towards side of the inverted conical disk;
    focusing pump light beams toward the axis of the active fiber; and
    coupling pump light beam to one or more sides of the active fiber through the inverted conical disk.

10. A method for coupling a plurality of pump light beam sources, the method comprising:
    providing a concave lens;
    providing an active fiber in the center of the concave lens, wherein at least a portion of the active fiber extends into the center of the concave lens;
    providing pump light sources for emitting pump light beams;
    providing focusing lenses for focusing pump light beams;
    emitting pump light beams towards a side of the concave lens;
    focusing pump light beams towards the axis of the active fiber; and
    coupling pump light beams to one or more sides of the active fiber through the concave lens.

11. A high powered fiber laser comprising:
    an active fiber;
    means for coupling high-powered pump light into active fiber around a circumference of the active fiber, wherein active fiber is located in center of the coupling means and at least a portion of the active fiber extends into the center of the coupling means;
    a plurality of pump light sources; and
    a plurality of lenses for focusing pump light beams from pump light sources toward coupling means, wherein coupling means couples pump light beams into one or more sides of the active fiber.

12. The high powered fiber laser of claim 11 wherein coupling means is inverted cortical disk.

13. The high powered fiber laser of claim 11 wherein coupling means comprises a glass wedge.

14. The high powered fiber laser of claim 11 wherein coupling means comprises a concave lens.

* * * * *